(12) United States Patent
Hayashi et al.

(10) Patent No.: US 7,931,923 B2
(45) Date of Patent: Apr. 26, 2011

(54) APPARATUS AND METHOD FOR MANUFACTURING A LOAF OF BREAD

(75) Inventors: Torahiko Hayashi, Utsunomiya (JP); Keiji Hayashi, legal representative, Utsunomiya (JP); Michio Morikawa, Utsunomiya (JP); Sadao Ueno, Utsunomiya (JP); Hiroyuki Okaizumi, Utsunomiya (JP)

(73) Assignee: Rheon Automatic Machinery Co., Ltd., Tochigi-ken (JP)

( * ) Notice: Subject to any disclaimer, the term of this patent is extended or adjusted under 35 U.S.C. 154(b) by 543 days.

(21) Appl. No.: 11/974,289

(22) Filed: Oct. 12, 2007

(65) Prior Publication Data

US 2008/0095885 A1 Apr. 24, 2008

Related U.S. Application Data

(63) Continuation-in-part of application No. 10/465,419, filed on Jun. 19, 2003, now abandoned.

(30) Foreign Application Priority Data

Oct. 18, 2002 (JP) ................................ 2002-304049
Dec. 29, 2002 (JP) ................................ 2002-379429
Mar. 11, 2003 (JP) ................................ 2003-065697

(51) Int. Cl.
*A21D 8/00* (2006.01)
(52) U.S. Cl. .......... 426/18; 426/549; 426/498; 426/502; 426/503; 426/505; 426/518; 426/523
(58) Field of Classification Search .................... 426/18, 426/60, 496, 498, 502, 503, 505, 512, 518, 426/523
See application file for complete search history.

(56) References Cited

U.S. PATENT DOCUMENTS

| | | | | |
|---|---|---|---|---|
| 1,703,182 A | * | 2/1929 | Tessin | 426/302 |
| 1,812,769 A | * | 6/1931 | Binger | 426/27 |
| 1,929,358 A | * | 10/1933 | Keefer | 426/76 |
| 1,973,926 A | * | 9/1934 | McCarthy | 426/27 |
| 2,256,936 A | * | 9/1941 | Battiste | 426/486 |
| 2,649,379 A | * | 8/1953 | Woods | 426/393 |

(Continued)

FOREIGN PATENT DOCUMENTS

GB 216087 2/1986

(Continued)

OTHER PUBLICATIONS

The Rodale Cookbook, 1973, Nancy Albright, Rodale Press Book Division, Emmaus, PA, p. 354.*

(Continued)

*Primary Examiner* — Drew E Becker
(74) *Attorney, Agent, or Firm* — Sughrue Mion, PLLC

(57) ABSTRACT

A method for manufacturing a loaf of bread of this invention is comprised of a forming step to form a sheet from a block of bread dough that is kneaded from the raw materials for bread, a further forming step to form a bar-like dough by rolling or folding the sheet, a cutting step to cut the bar-like dough, and a placing step to place the bar-like pieces of dough that were cut at the cutting step into a baking mold so that at least one cutting plane faces upward. If there are air bubbles between layers of the bar-like pieces of dough, the air bubbles can escape from a cutting surface of the bar-like pieces of dough when they rise and expand at the fermenting and baking steps.

7 Claims, 13 Drawing Sheets

U.S. PATENT DOCUMENTS

| | | | | |
|---|---|---|---|---|
| 2,853,029 | A | * | 9/1958 | Wilson ............................ 426/501 |
| 3,255,717 | A | * | 6/1966 | Nervo ............................. 426/497 |
| 3,368,503 | A | * | 2/1968 | Gaylord ........................... 426/19 |
| 4,053,641 | A | * | 10/1977 | Elling ............................. 426/19 |
| 4,809,575 | A | * | 3/1989 | Swanson .......................... 83/152 |
| 5,348,751 | A | * | 9/1994 | Packer et al. .................... 426/94 |
| 5,366,744 | A | * | 11/1994 | Drummond et al. ............ 426/128 |
| 5,437,223 | A | | 8/1995 | Hayashi |
| 6,171,629 | B1 | | 1/2001 | Morikawa |

FOREIGN PATENT DOCUMENTS

| | | |
|---|---|---|
| JP | 60-62281 | 5/1985 |
| JP | 61-19215 | 5/1986 |
| JP | 1-147324 | 10/1989 |
| JP | 5-268864 | 10/1993 |
| JP | 8-4446 | 1/1994 |
| JP | 6-209690 | 8/1994 |
| JP | 7-298827 | 11/1995 |
| JP | 2876515 | 11/1995 |
| JP | 9-172983 | 7/1997 |
| JP | 9-187213 | 7/1997 |
| JP | 9-322718 | 12/1997 |
| JP | 11-127806 | 5/1999 |
| JP | 2000157149 | 6/2000 |
| JP | 2001-299259 | 10/2001 |
| JP | 2002-28681 | 2/2002 |

OTHER PUBLICATIONS

Professional Baking, Second Edition, Wayne Gisslen, John Wiley & Sons, Inc., NY, 1994, p. 69.*

* cited by examiner

Fig. 13
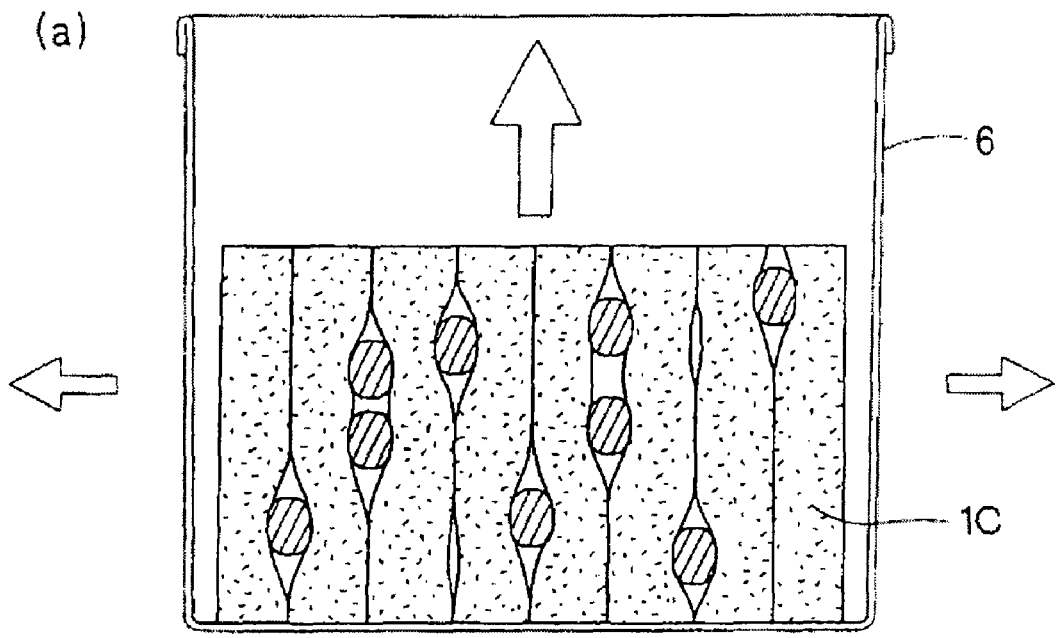
(a)
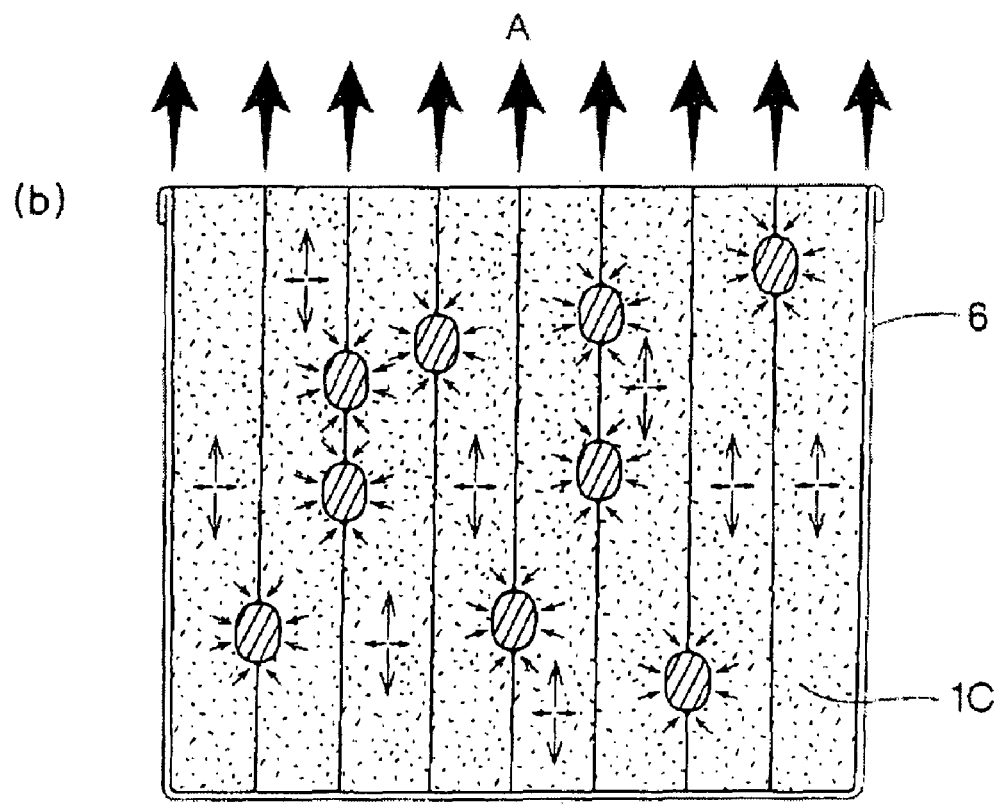
(b)

APPARATUS AND METHOD FOR MANUFACTURING A LOAF OF BREAD

This application is a continuation-in-part application of U.S. patent application Ser. No. 10/465,419, filed Jun. 19, 2003 now abandoned, and claims priority to the following Japanese Applications:

a) Japan 2002-304049, filed Oct. 28, 2002;
b) Japan 2002-379429, filed Dec. 29, 2002; and
c) Japan 20034-065697, filed Mar. 11, 2003.

TECHNICAL FIELD

This invention relates to an apparatus and a method for manufacturing a loaf of bread. Particularly, it relates to an apparatus and a method for manufacturing a loaf of bread that is made by fermenting and baking dough in a rectangular parallelepiped baking mold.

BACKGROUND OF INVENTION

Usually, in manufacturing a loaf of bread, bread dough is cut in a suitable size and placed in a rectangular parallelepiped baking mold. Then it is baked in an oven after a final fermenting of the bread dough with yeast.

Generally, the quality of the internal structure of a loaf of bread that is baked in an oven is dependent on the form and direction of the bread dough that is placed in a rectangular parallelepiped baking mold. Thus, research has been continued to improve the methods of placing bread dough.

Various placing methods are well known. For example, after a block of bread dough is extended and shaped into sheets, these sheets are rolled cylindrically (a bar-like form) by a molding machine, etc. Then, the rolled bread dough is curved and formed into a V-shape (disclosed in reference No. 1) and is placed in a rectangular parallelepiped baking mold. Placing methods for forming an M-shape (disclosed in reference No. 2), having an alternate placing direction for rolled bread dough (disclosed in reference No. 3), having a straight placing direction along a rectangular parallelepiped baking mold without any curving (disclosed in reference Nos. 4 and 5), and adding a twist to rolled bread dough (disclosed in reference No. 6) are also used so as to attain high-quality a loaf of bread.

The references described above are as follows:

(1) Reference No. 1: Japanese Patent Gazette No. 61-19215. (See paragraph 7 and FIG. 1.)

(2) Reference No. 2: Japanese Utility Model Laid-open No. 60-62281. (See FIGS. 1-5.)

(3) Reference No. 3: Japanese Patent Gazette No. 8-4446. (See FIG. 10.)

(4) Reference No. 4: Japanese Patent Laid-open No. 11-127806. (See claim 1 and FIG. 2.)

(5) Reference No. 5: Japanese Patent No. 2876515. (See FIGS. 2, 3, and 4.)

(6) Reference No. 6: Japanese Patent Laid-open No. 2001-299259. (See claim 1.)

SUMMARY OF INVENTION

In the conventional technology described above, rolled bar-like bread dough is used that is formed by rolling sheets of bread dough. In this case, air bubbles may rise between layers of the rolled bar-like bread dough when layers of a formed roll are slackened or gaps are generated between them. Thus the rolled bar-like bread dough may be placed in a rectangular parallelepiped baking mold with the air bubbles in it.

As a result of the air bubbles in the rolled bar-like bread dough, large air holes may occur in baked bread and degrade the quality of it, because the air bubbles cannot escape from the rolled bar-like bread dough.

The present invention is intended to overcome these disadvantages and to provide manufacturing methods without any air holes being formed in the baked bread.

To solve the above problem, a method according to this invention is comprised of a conveying step to convey sheets or a continuous sheet that is formed from a block of bread dough that is kneaded from raw materials for bread, a forming step to form the sheets or the continuous sheet into a bar-like dough by rolling them in a direction transverse to them or folding them, a cutting step to cut the bar-like dough to a predetermined size, a conveying step to continuously transfer the bar-like pieces of dough that have been cut, a placing step to place a plurality of bar-like pieces of dough in a rectangular parallelepiped baking mold so that at least one cutting plane faces vertically up from the baking mold to enable air bubbles in the layers of dough to escape from the cutting plane of the bar-like pieces of dough, and so that the plurality of the bar-like pieces of dough are disposed on a line and at equal intervals in the baking mold, a fermenting step to ferment the plurality of the bar-like pieces of dough; and a baking step to bake the plurality of the bar-like pieces of dough, wherein at the fermenting and baking steps, the bar-like pieces of dough expand in the mold and fill the entire space in the mold without any spaces being formed between the bar-like pieces of dough and between the bar-like pieces of dough and the wall of the mold.

At the placing step, when the plurality of bar-like pieces of dough are placed in the rectangular parallelepiped baking mold, they may be placed in the mold under the condition that the side surfaces of the plurality of bar-like pieces of dough contact each other.

Furthermore, to solve the above problem an apparatus according to this invention is comprised of a conveyor to convey sheets or a continuous sheet that is formed from a block of bread dough that is kneaded from raw materials for bread, a forming apparatus to form the sheets or the continuous sheet into bar-like dough by rolling the sheets in a direction transverse to them or folding them, a cutting apparatus to cut the bar-like dough in a predetermined size, a conveyor to continuously transfer the bar-like pieces of dough that have been cut, and a placing apparatus to place a plurality of bar-like pieces of dough in a rectangular parallelepiped baking mold so that at least one cutting plane faces vertically up from the baking mold to enable air bubbles in the layers of dough to escape from the cutting plane of the bar-like pieces of dough, and so that the plurality of the bar-like pieces of dough are disposed on a line and at equal intervals in the baking mold, a fermenting apparatus to ferment the plurality of the bar-like pieces of dough; and a baking apparatus to bake the plurality of the bar-like pieces of dough, wherein for the fermenting and baking apparatuses, the bar-like pieces of dough expand in the mold and fill the entire space in the mold without any spaces being formed between the bar-like pieces of dough and between the bar-like pieces of dough and the wall of the mold.

For the placing apparatus, when the plurality of bar-like pieces of dough are placed in the rectangular parallelepiped baking mold, they may be placed in the mold under the condition that the side surfaces of the plurality of bar-like pieces of dough contact each other.

Before or during the cutting step to cut the bar-like dough, said bar-like dough may also be deformed so that it has an elliptic cross section.

The apparatus according to this invention may further be comprised of a scattering apparatus to scatter solid food particles on the sheets or the continuous sheet on the conveyor to convey them or it so that said bar-like dough includes solid food particles in it.

According to the apparatus and the method of this invention, at the fermenting and baking steps, the bar-like pieces of dough expand in the rectangular parallelepiped baking mold and fill the entire space in the mold without any spaces being formed between the bar-like pieces of dough and between the bar-like pieces of dough and the wall of the mold. Further, the plurality of the bar-like pieces of dough are placed in the mold so that at least one cutting plane faces vertically up from the mold. Thus, if there are air bubbles between the layers of the bar-like dough that are rolled or folded, since the plurality of the bar-like pieces of dough are pressurized in the mold, and then the pressure of the air bubbles increases, the air bubbles in the layers of dough can escape from said cutting plane of the bar-like pieces of dough at the fermenting and baking steps. Thus the air bubbles do not remain in the bar-like pieces of dough.

As explained above, since the present invention includes the forming step to form the bar-like dough by rolling or folding the sheets of dough includes the cutting step to cut the bar-like dough, and includes the placing step to place the bar-like pieces of dough in the baking mold so that at least one cutting plane of them faces vertically up from the mold, if there are air bubbles between the layers of the bar-like dough they can easily escape from the bar-like pieces of dough, and a high-quality loaf of bread may be manufactured efficiently.

BRIEF DESCRIPTIONS OF THE DRAWINGS

FIG. 13 shows schematic diagrams illustrating how air bubbles escape from bar-like pieces of dough that include solid food particles.

PREFERRED EMBODIMENT OF THIS INVENTION

Figure 1:
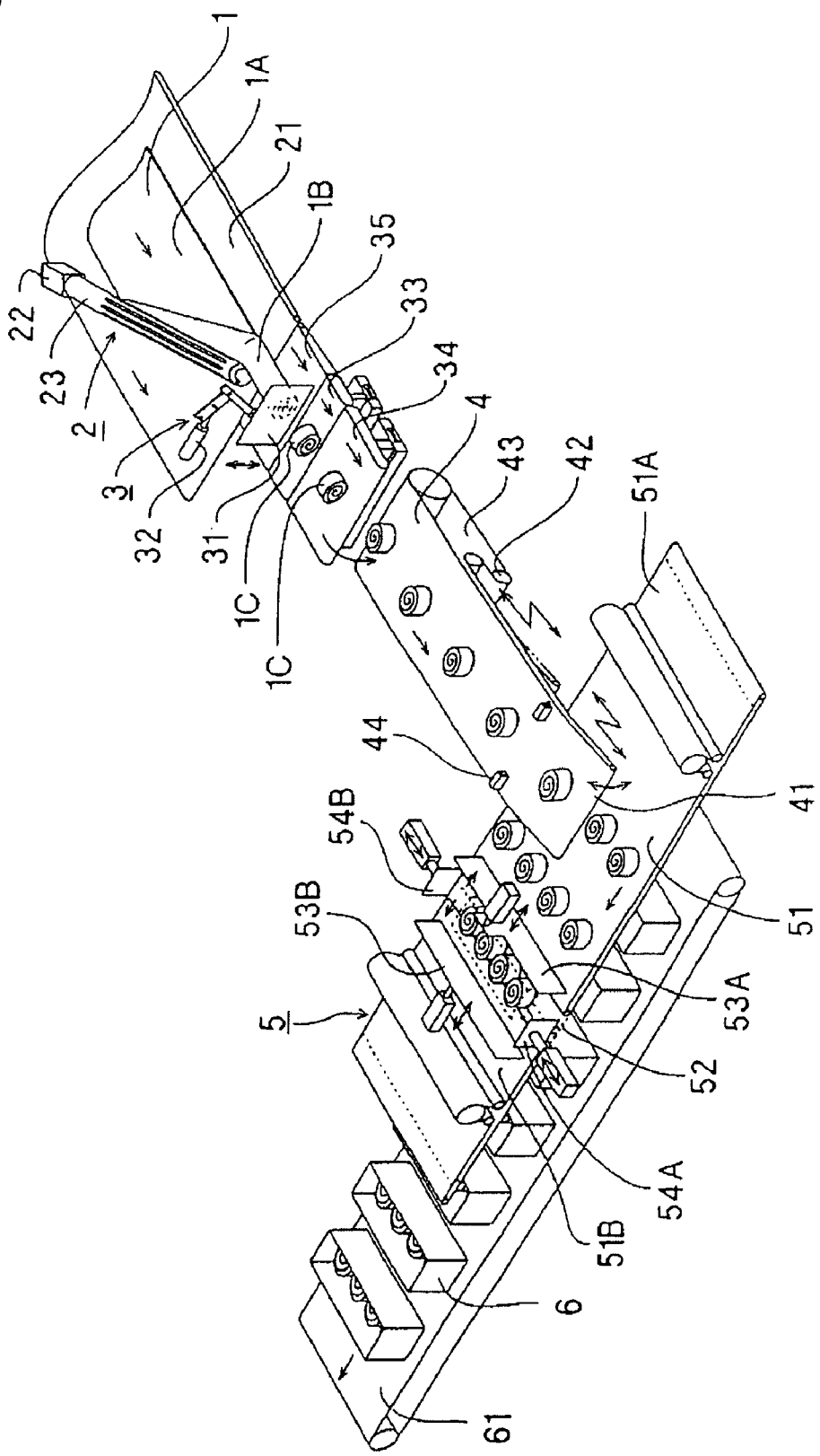
FIG. 1 shows a perspective view of an apparatus for manufacturing a loaf of bread according to the present invention.
Figure 2:
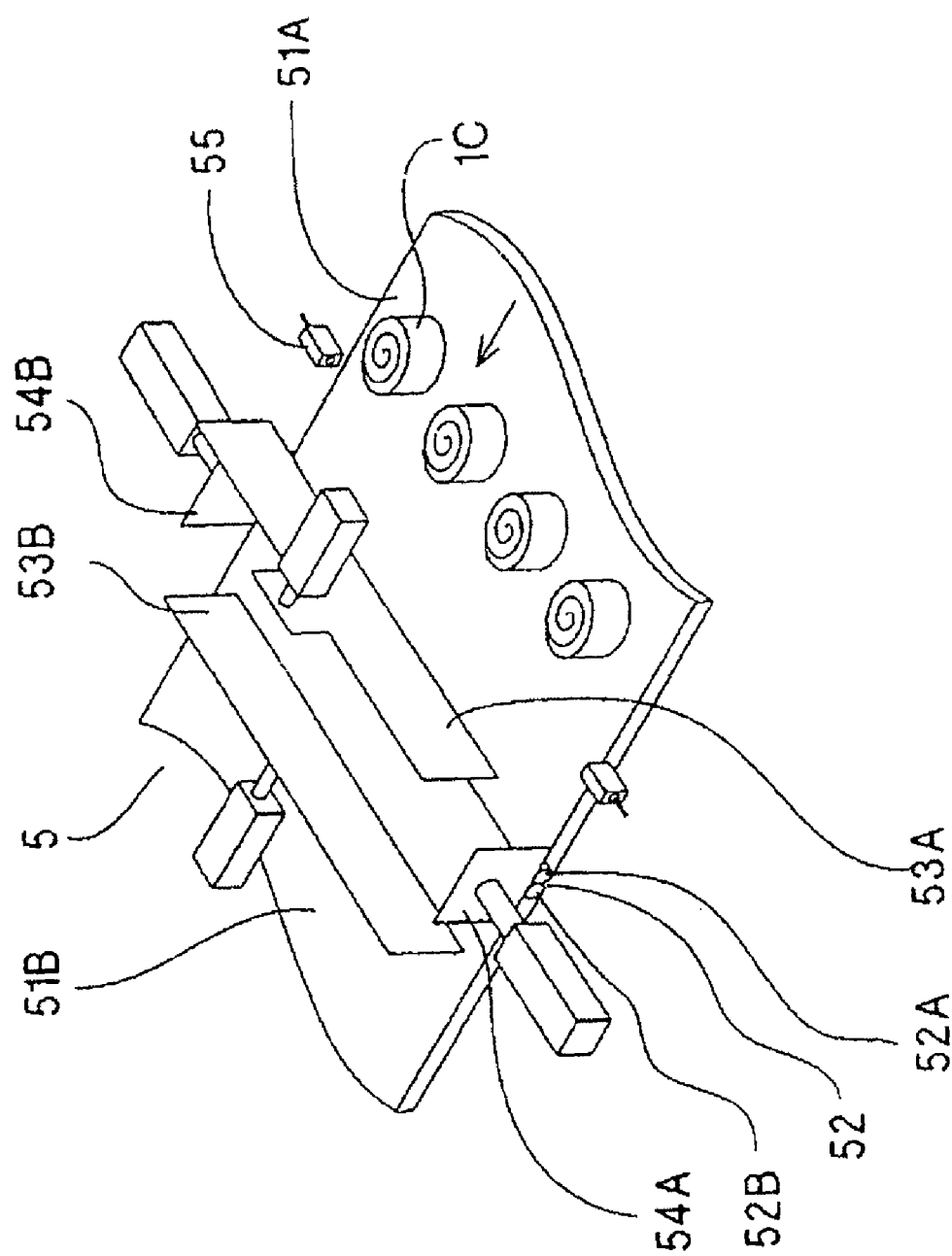
FIGS. 2-6 show diagrams of a placing apparatus while it is operating according to the present invention.
Figure 3:
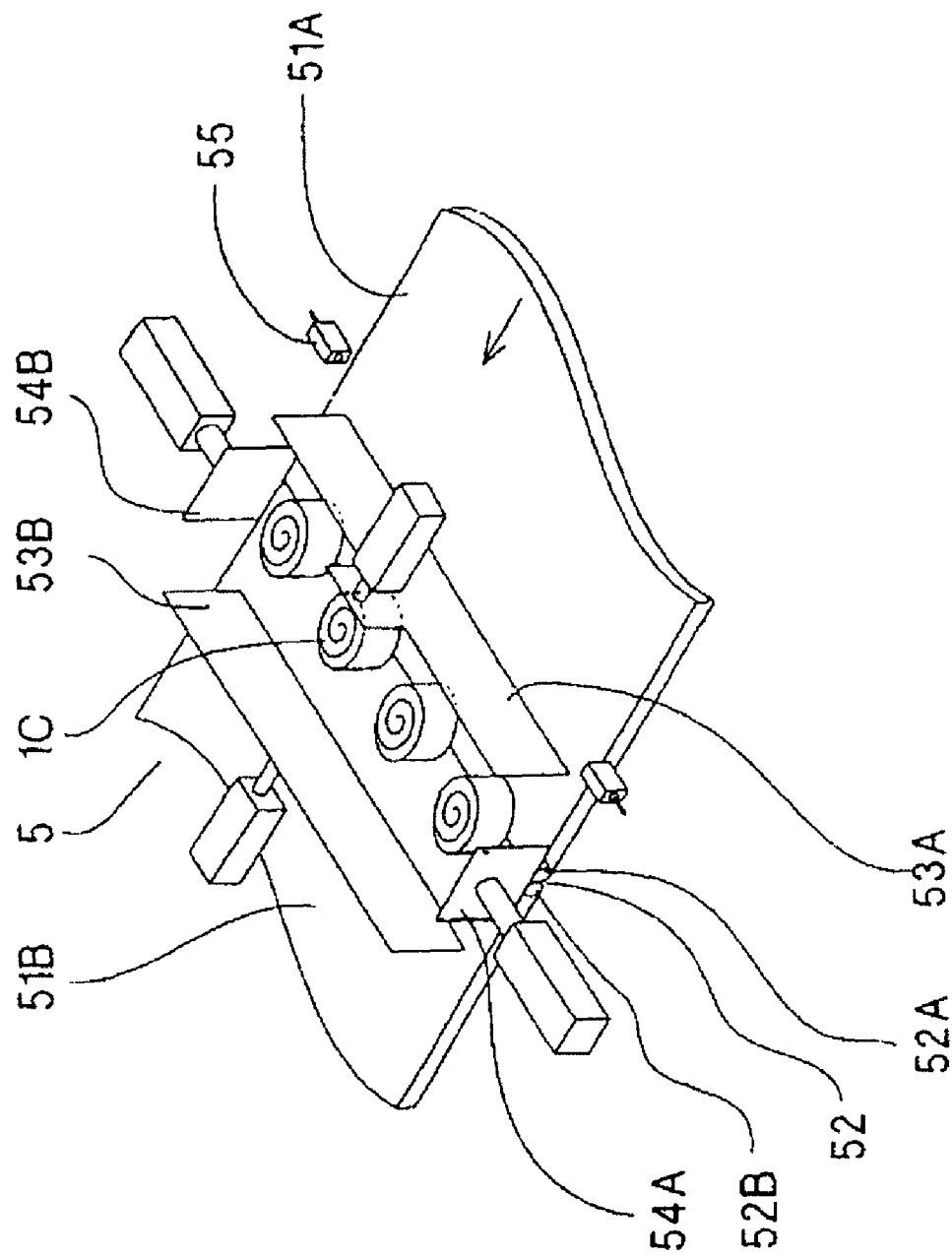
Figure 4:
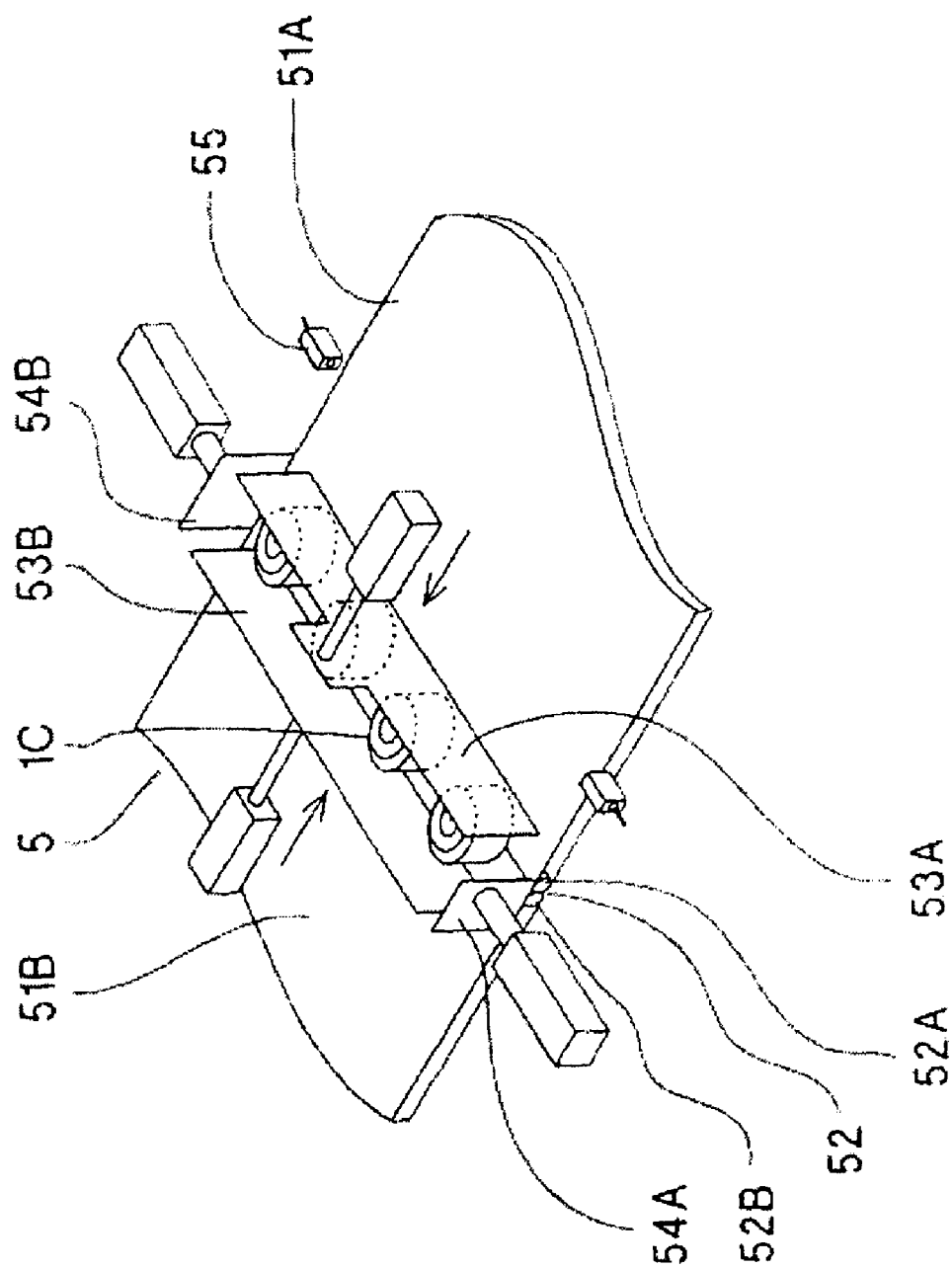

First, the present invention is explained based on an embodiment. FIG. 1 is a perspective view of an apparatus for manufacturing the loaf of bread of this invention. In this embodiment, a conveyor 21 conveys a continuous sheet of bread dough 1, a forming apparatus 2 forms the continuous sheet of bread dough 1A into bar-like dough 1B by rolling the sheets, and then a cutting apparatus 3 cuts the bar-like dough 1B into bar-like pieces of dough 1C having a predetermined size. The bar-like pieces of dough 1C are transferred to a placing apparatus 5 by a transfer conveyor 4. Then a predetermined number of the bar-like pieces of dough 1C are placed in a baking mold 6 by the placing apparatus 5.

Next, this embodiment is described in detail.

The continuous sheet of bread dough 1A is formed from a block of bread dough that is kneaded from raw material for a loaf of bread. Generally, lean dough, which contains little fat and little sugar, is used for the bread dough of the loaf of bread. The continuous sheet of bread dough 1A is prepared in advance by any dough-sheet-forming apparatus that is well known. For example, a stretching apparatus for food dough provides sheets of bread dough (Japanese Patent Application No. 2002-28681, by this same patent applicant). Also, Japanese Patent Laid-open Nos. 9-172983 and 9-187213 both disclose an apparatus for supplying sheets of food dough. These apparatuses each have two groups of rollers that are arranged in a V-shape so that the distance between the upper rollers is greater than that between the lower rollers. In this present invention, a dough-sheet-forming apparatus can further form sheets having a predetermined thickness, if required.

The forming apparatus 2 forms the sheet of bread dough 1A into bar-like dough 1B by rolling the sheets from one side. A roller 23 is disposed diagonally across the sheet of bread dough 1A so that the head of the roller faces downstream of the conveyor. A motor 22 drives the roller 23 so that the direction of the rotation corresponds to lifting the sheet of bread dough up (counterclockwise from the front view).

Thus, the roller 23 contacts the sheet of bread dough 1A and gradually rolls it up cylindrically so that the rolled bread dough has a spiral pattern at the cross section of it, and then it moves downstream on the conveyor, and bar-like dough 1B is finished when it comes down to the head of the roller 23. A cutting conveyor 35 conveys it. The diagonal angle of the roller 23 is adjusted according to the thickness, width, and properties of the sheet of bread dough, and the diameter of the bar-like dough or number of layers of the bar-like dough that is rolled.

The diameter of the roller 23 may be gradually increased as it goes downstream, because the diameter of the bar-like dough at the foot of the roller 23 is different from it when it was at the head of the roller. When the width of the sheet and diameter of the bar-like dough are large, plural rollers can also be used instead of a single roller 23. In this case, the diameter of the downstream roller may be larger than that of the upstream roller, or the rotation speed of the downstream roller may be higher than that of the upstream roller.

The bar-like dough 1B is cut to a predetermined size by the cutting apparatus 3. The cutting apparatus 3 is provided with a cutter 31, a driving unit for a cutter 32, a first weighing conveyor 33, and a second weighing conveyor 34. The first weighing conveyor 33 measures the weight of the continuous bar-like dough 1B. When the measured weight reaches a predetermined value, the cutter 31 operates to cut the bar-like dough 1B by the action of the driving unit of the cutter 32, which unit has mechanisms such as an air cylinder.

The bar-like pieces of dough 1C that have been cut are transferred from the first weighing conveyor 33 to the second weighing conveyor 34. The second weighing conveyor 34 measures the weight of the bar-like pieces of dough 1C again. According to the measurements of the second weighing conveyor 34, the timing of the cutting operation with the cutter 31 by the driving unit of the cutter 32 is controlled by a feedback control system. When the length of the bar-like pieces of dough 1C exceeds the length of the first weighing conveyor 33, the cutting operation may be carried out according to the sum of the measurements of the first weighing conveyor 33 and the second weighing conveyor 34.

In this embodiment, the cutting method to cut the bar-like dough 1B according to the measurements of the weight of the bar-like pieces of dough 1C by the weighing conveyors 33 and 34 is used. But another cutting method to cut the bar-like dough 1B according to the length of the bar-like pieces of dough 1C also may be available. In this case, the cutting apparatus can cut the bar-like dough 1B into bar-like pieces of dough 1C having a predetermined length, according to means such as a rotary encoder, to detect when the distance moved by the conveyor belt is equal to the length of the bar-like pieces of dough 1C.

As explained in the above paragraphs, in this specification the wording "a predetermined size" has two meanings. One is "a predetermined weight," and the other is "a predetermined length." There is a difference in height between the transfer conveyor 4 and the second weighing conveyor 34. This causes the bar-like pieces of dough 1C, which have two cutting planes, one at each end, to be turned over so that one of their cutting planes faces the belt of the transfer conveyor 4, and the other faces upward when the bar-like pieces of dough 1C are transferred from the second weighing conveyor 34 to the transfer conveyor 4. Then the transfer conveyor 4 conveys the bar-like pieces of dough 1C.

This difference in height is adjusted according to the length of the bar-like pieces of dough 1C so that they can be definitely turned over.

The downstream end 41 of the transfer conveyor 4 can move up and down and access or withdraw from a belt 51A of a conveying portion 51 of the placing apparatus that is disposed below the transfer conveyor 4. The downstream end 41 can move from one side to the other side of the conveying portion 51 along the transverse direction. Thus the transfer conveyor 4 can in turn transfer the bar-like pieces of dough 1C to the conveying portion 51. In doing so, the conveying portion 51 is assisted by the reverse movement of the downstream end 41.

FIG. 1 shows that four bar-like pieces of dough 1C are arranged in one sequence along the transverse direction of the conveying portion 51. For example, since the downstream end 41 can move downward and backward with a predetermined time delay when sensors 44 detect the bar-like pieces of dough 1C that are to be transferred, the transfer conveyor 4 can in turn transfer them onto the conveying portion 51. When the intervals among the bar-like pieces of dough 1C on the transfer conveyor 4 are not equal, the intervals of the transferred bar-like pieces of dough 1C on the conveying portion 51 do not become equal. In this case, a method described below may be used so as to make the intervals of the bar-like pieces of dough 1C on the conveying portion 51 be equal. As another embodiment, Japanese Patent Laid-open No. 9-322718 discloses a method to vary the backward movement speed of the downstream end 41 depending on the intervals of the bar-like pieces of dough 1C on the transfer conveyor 4, so that the intervals of them on the conveying portion 51 are made equal.

As another embodiment to equalize the intervals of the bar-like pieces of dough 1C on the conveying portion 51, Japanese Utility Model Laid-open No. 1-147324 also discloses a method where the downstream end 41 is moved backward at a predetermined distance from the stationary position when the bar-like pieces of dough 1C are detected by the sensors 44 while a belt 43 of the transfer conveyor 4 is moving continuously. This sequence is repeated to complete their transfer.

An idle pulley is moved so as to apply tension to the belt when the downstream end 41 of the transfer conveyor 4 goes backward.

The placing apparatus is provided with the conveying portion 51, which has the belt 51A for receiving the bar-like pieces of dough 1C from the transfer conveyor 4 and a space 52 between the downstream end of the belt 51A and the upstream end of the belt 51B facing the end of the belt 51A.

The space 52 is defined by the end plates 52A and 52B, which can access or withdraw from each other. (See FIGS. 2-6.)

There are guide plates 53A and 53B above the space 52, and they are able to access or withdraw from each other while closing or widening the space 52 by means of a driving means such as air cylinders. There are guide plates 54A and 54B at both sides of the guide plates 53A and 53B. They can access or withdraw from each other by means of a driving means such as air cylinders. There is a sensing apparatus 55 at the upstream side of the guide plate 53A to detect the bar-like pieces of dough 1C.

In addition, the guide plate 53A can move vertically so as to avoid interfering with the bar-like pieces of dough 1C being carried by the conveying portion 51.

There is a conveying portion 61 for molds 6 below the space 52. The conveying portion 61 supplies the baking molds 6 under the space 52 at suitable times.

The conveying portion 61 for the molds 6 can convey each baking mold 6 to the required position according to the construction or configuration of the baking molds 6.

Generally, in a process for manufacturing a loaf of bread, a baking mold having a rectangular parallelepiped shape may be used for fermenting and baking bread dough. For example, a typical baking mold has a bottom panel of 365×120 mm, an upper surface (opening portion) of 370×124 mm, and a depth of 136 mm.

Figure 5:
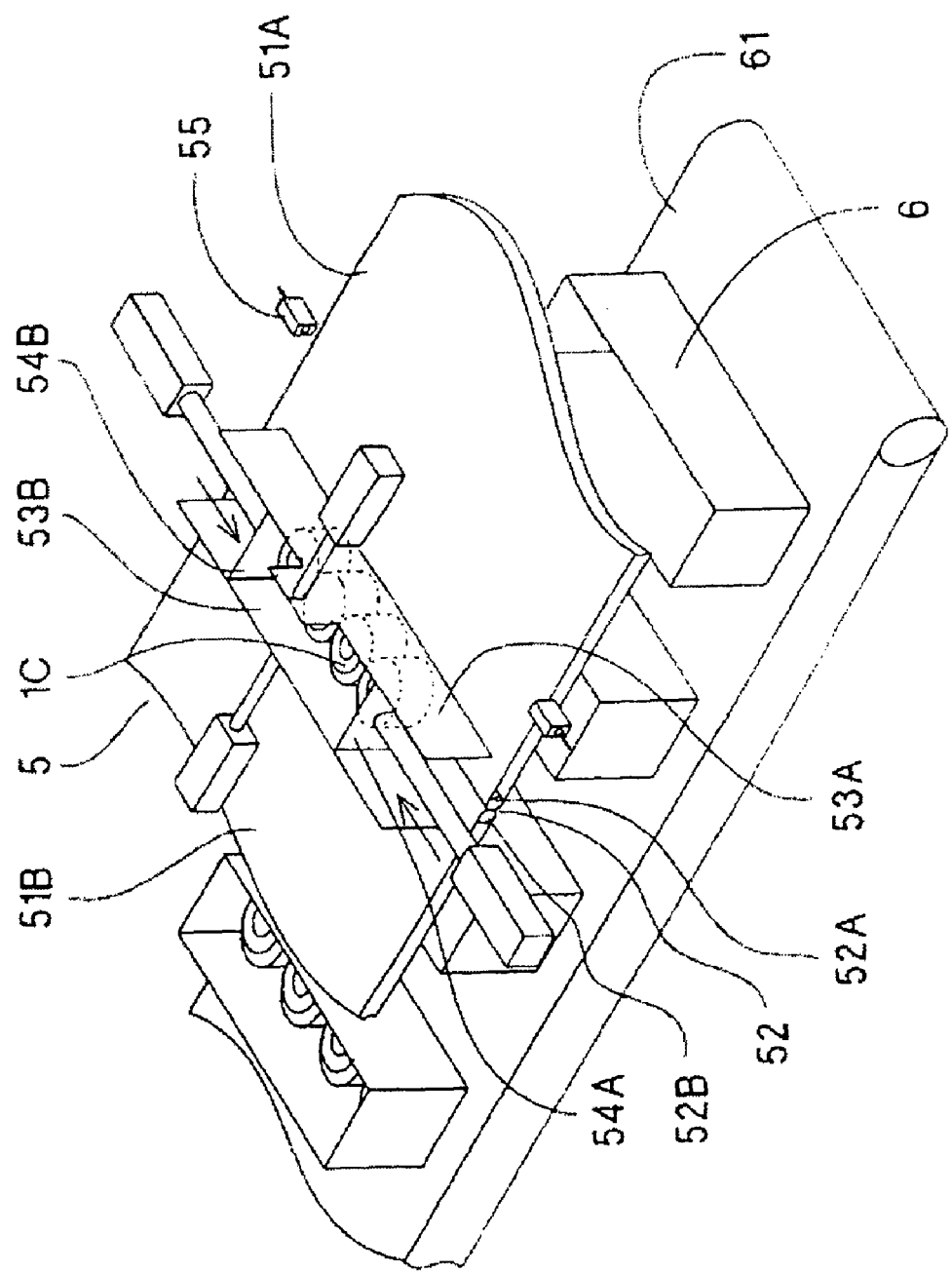
Figure 6:
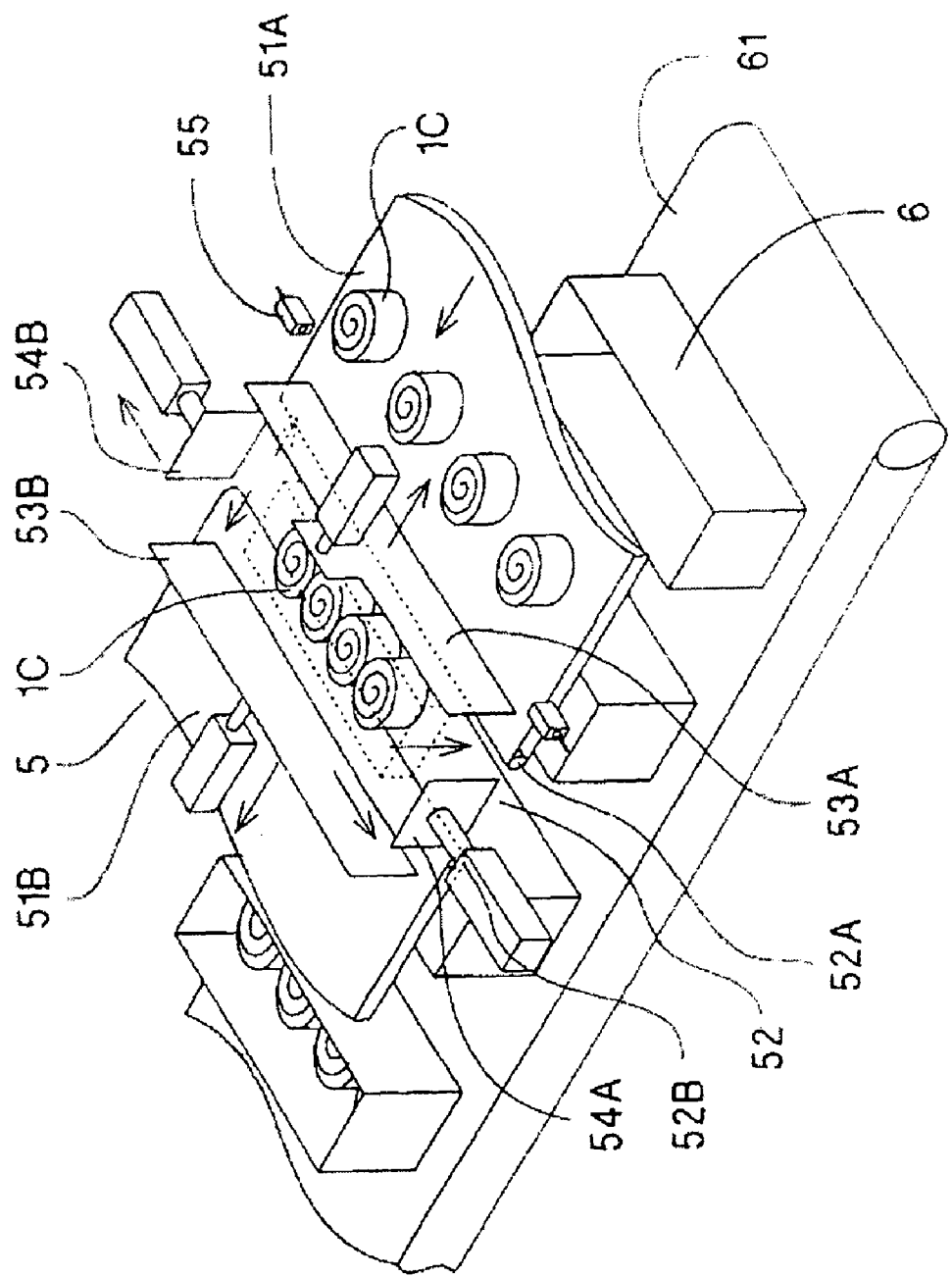

FIGS. 5 and 6 show that each baking mold is independent. For example, even if three baking molds 6 are connected to each other, the conveying portion 61 for the molds 6 can convey them suitably by the construction of the conveying portion 61 for the molds 6 being changed, if required.

Next, each step for manufacturing the loaf of bread is below described in detail based on the previously-discussed embodiments of the present invention.

First, the forming apparatus 2 forms the sheet of bread dough 1A into the bar-like dough 1B by rolling the sheet from one side with the rotating roller 23. Then the cutting apparatus 3 cuts the bar-like dough 1B to bar-like pieces of dough 1C that are short and that has a cylindrical shape and a predetermined size, namely, a predetermined weight or length. The transfer conveyor 4 conveys the bar-like pieces 1C that have been cut so that the cutting planes of them face upward and downward of them.

In this embodiment, the downstream end 41 of the transfer conveyor 4 moves backward and transfers the bar-like pieces of dough 1C on the conveying portion 51 of the placing apparatus 5 so that four bar-like pieces of dough 1C are disposed side-by-side and at equal intervals across the conveying portion 51.

When the sensing apparatus 55 detects the arranged bar-like pieces of dough 1C, the conveying portion 51 is stopped so that the arranged bar-like pieces of dough 1C are disposed at the predetermined location at a space 52 between adjacent belts. The guide plates 53A and 53B, and 54A and 54B move to access and withdraw from each other respectively, so as to determine the position of the arranged bar-like pieces of dough 1C. This precise positioning allows them to be easily placed in the rectangular parallelepiped baking molds 6. In this process, the arranged bar-like pieces of dough 1C may be positioned so that the side surfaces of the bar-like pieces of dough contact each other. This positioning allows them to be placed in the baking molds 6 under the condition that the side surfaces of the bar-like pieces of dough contact each other. In these cases, the arranged bar-like pieces of dough 1C are disposed in the baking mold in a line and at equal intervals.

In contrast, the arranged bar-like pieces of dough 1C may be positioned so that their side surfaces do not contact each other. This positioning allows them to be placed in the baking molds 6 with spaces between their side surfaces. In this case, the arranged bar-like pieces of dough 1C are also disposed in the baking mold in a line and at equal intervals.

Then, when the end plates 52A and 52B at the space 52 between the belts move to withdraw from each other, the arranged bar-like pieces of dough 1C drop down and are placed in the rectangular parallelepiped baking molds. This sequence is repeated, to complete their placement in the baking molds.

Figure 7:
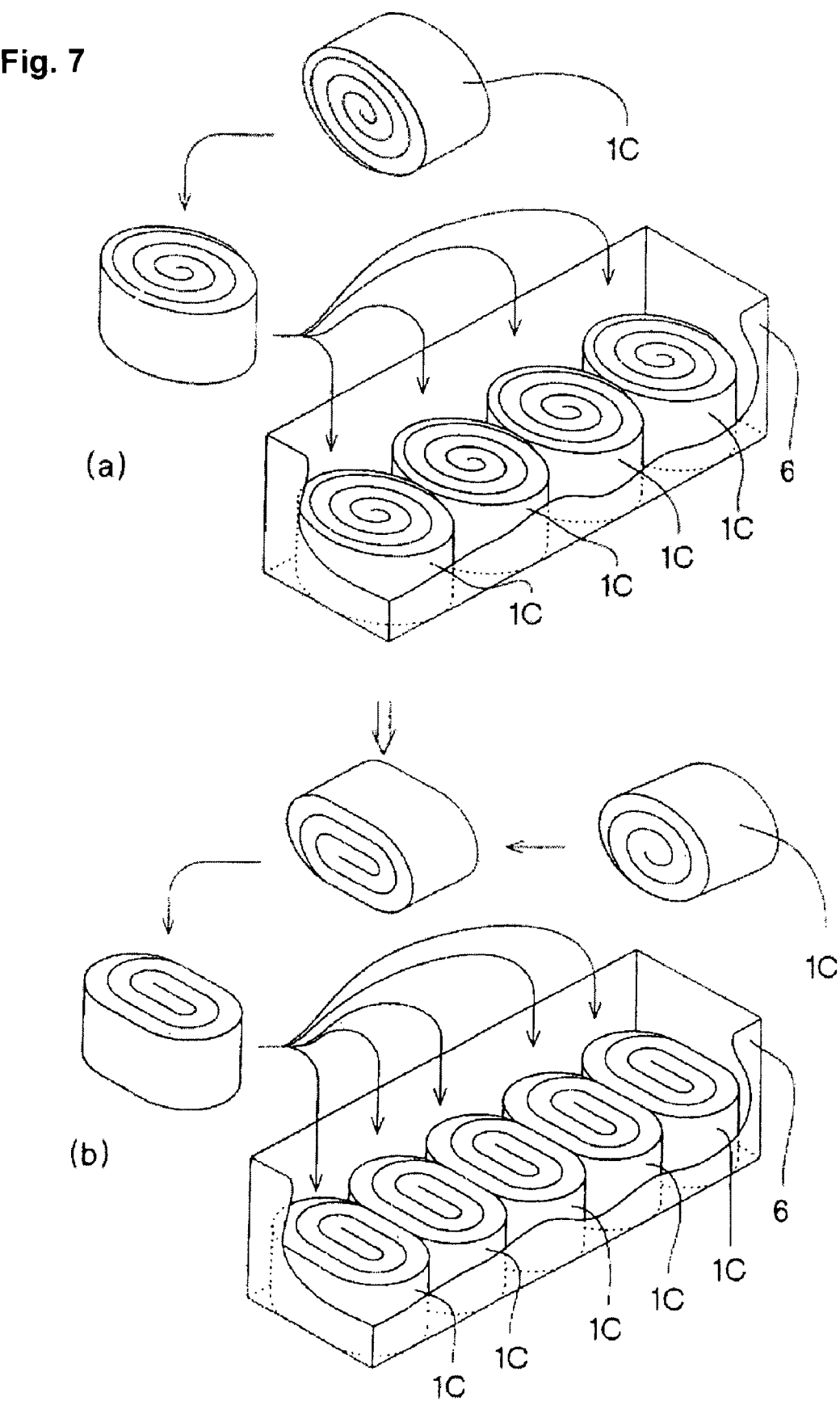
FIG. 7(a) shows the first embodiment placing bar-like pieces of dough of this invention.
FIG. 7(b) shows the second embodiment placing bar-like pieces of dough of this invention.

In the embodiment described above, the number of bar-like pieces of dough 1C that are placed in a rectangular parallelepiped baking mold at one time is four. But this number is not limited. If more than four dough pieces are required to be placed in a baking mold, it is possible to place such a number of the bar-like pieces of dough 1C in a baking mold when the diameter of each of them is decreased. In this case, the bar-like pieces of dough 1C may be deformed so that they have elliptic cross sections (see FIG. 7 (b)), so as to efficiently place them in the baking mold.

Figure 9:
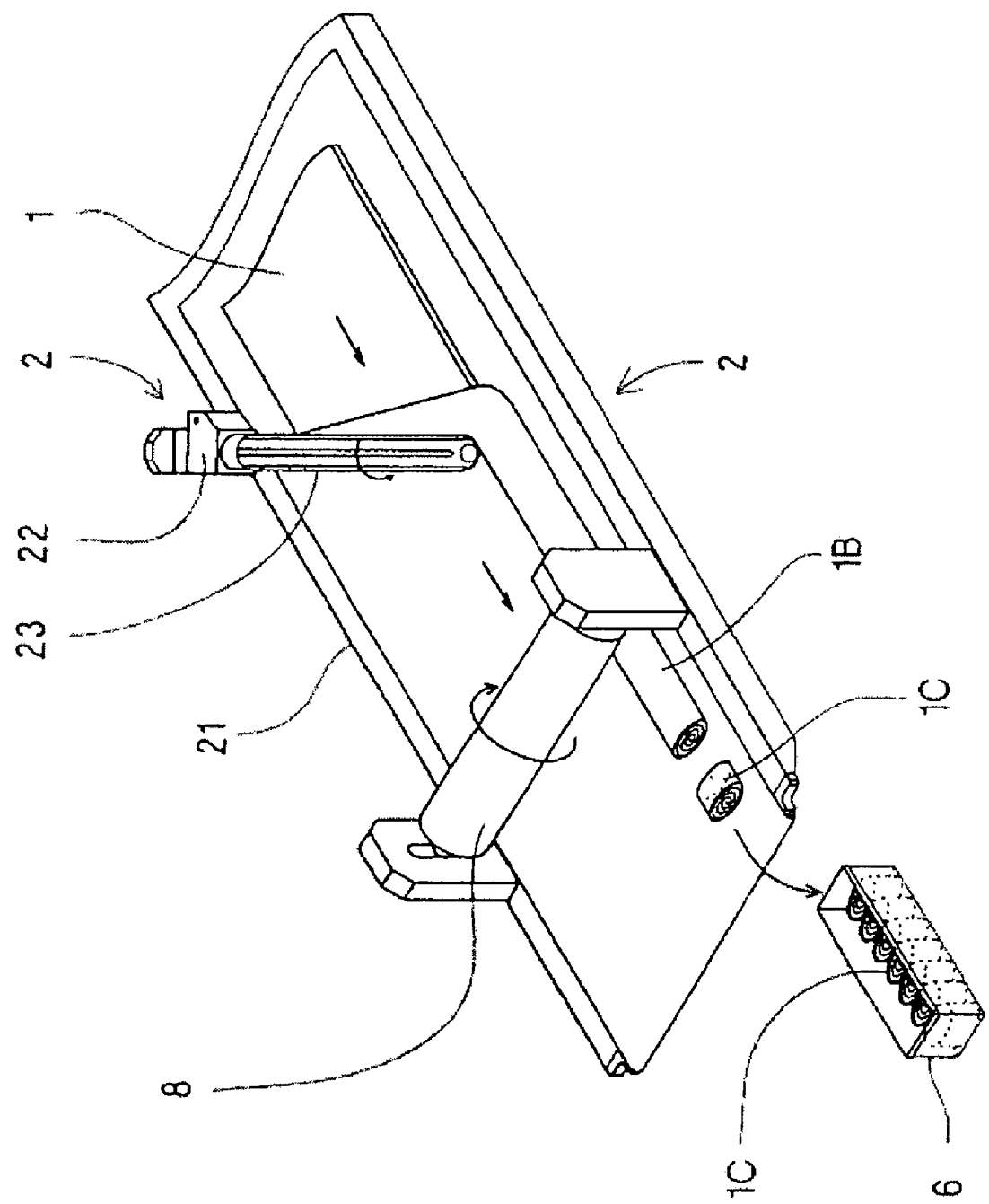

FIG. 9 shows the part of the apparatus for manufacturing a loaf of bread that is further supplied with a deforming step to deform the bar-like dough 1B so that it has an elliptic cross section, among other steps shown in FIG. 1. A roller 8 is used to deform the bar-like dough 1B. The distance between the roller 8 and the surface of the belt of the conveyor is adjusted so that at least it becomes less than the diameter of the bar-like dough 1B conveyed by the conveyor. The roller 8 rotates in a direction so that the moving direction of the roller 8 at the contact surface with the bar-like dough 1B corresponds to the moving direction of the bar-like dough 1B.

The cutting apparatus (not shown in FIG. 9) cuts the deformed bar-like dough 1B, having an elliptic cross section, by the same method as in the embodiment shown in FIG. 1.

Deformed bar-like pieces of dough 1C can be placed in the rectangular parallelepiped baking mold more efficiently than in the embodiment shown in FIG. 1 because of the elliptic deformation of them.

The height of the bar-like pieces 1C in the rectangular parallelepiped baking mold is determined by the length of them, as is defined by the cutting apparatus that cuts the bar-like dough 1B. The length of the bar-like pieces 1C can be determined according to the depth of the baking molds 6. In this embodiment, the length of the bar-like pieces 1C corresponds to ½ to ⅓ of the depth of the baking molds.

The bar-like pieces 1C placed in the rectangular parallelepiped baking molds 6 will ferment with yeast and rise at the fermenting step (not shown in the figure), and they rise further at the baking step. Generally, for example, the bar-like pieces 1C placed in the baking molds 6 rise so that the upper surface of them reach 10□15 mm below the upper surface of the baking molds 6 at the fermenting step. Then, at the baking step, they rise further so that the upper surfaces of them protrude above the upper surfaces of the baking molds 6. In this case, a quadrilateral-shaped loaf of bread can be made if a lid is used on the baking molds 6. The quadrilateral-shaped loaf of bread is called "Pullman Bread." The loaf of bread which is fermented and baked without a lid on the baking molds 6 is called "Round Top Bread."

This invention can be applied to both the Pullman Bread and the Round Top Bread.

In the embodiment discussed above, the rectangular parallelepiped baking molds will be filled with the bar-like pieces 1C that are rising at the fermenting and baking steps. At this time, the bar-like pieces 1C rise in the baking molds and expand horizontally and vertically until they contact the side walls of the baking molds and adjacent bar-like pieces 1C (see FIG. 7(a)), and then they expand vertically. Namely, the bar-like pieces of dough expand in the mold and fill the entire space in the mold without any spaces being formed between the bar-like pieces of dough and between the bar-like pieces of dough and the wall of the mold In the embodiment discussed above, even if the air bubbles remain between the layers of the bar-like pieces 1C when the layers are slackened or gaps are generated between them, since when the bar-like pieces 1C rise and expand in the mold at the fermenting and baking steps they contact the side walls of the mold and adjacent dough pieces, the interior pressure of the dough increases. Therefore, the interior pressure of the dough forces the remaining air bubbles to move upward through the layers of the bar-like pieces 1C, and they easily escape from them.

Namely, in the conventional placing method to place bread dough in a rectangular parallelepiped baking mold, large air holes may remain in the baked bread as a result of the air bubbles remaining between the layers of the bread dough. Because the end surfaces of the bar-like pieces (including the cutting planes) do not face upward, the end surfaces contact the side or bottom walls of the baking mold, and so the air bubbles remaining between the layers of the bread dough cannot escape from the bread dough through the end surfaces while it is rising. However, there is no such shortcoming in this invention.

This invention is not limited to the embodiments discussed above. It may take any number of suitable forms without departing from the scope of this invention.

For example, a single dough bar 1B is transferred in these embodiments, but plural dough bars 1B may be transferred to the placing apparatus.

This invention intends to release the air bubbles from the cutting plane of the bar-like pieces of dough, which are made by rolling or folding a sheet of bread dough, placed in the baking mold so that at least one cutting plane faces upward. Thus, this invention is not limited to the embodiments where both cutting planes of the bar-like pieces of dough face upward and downward. For example, when the bar-like pieces of dough having a U-shape are placed in the baking mold so that both cutting planes face upward, even if curved portions exist in the lower part of the baking mold, the air bubbles may escape from the bar-like pieces of dough through the cutting planes, because the cutting planes exist at the upper side of the baking mold.

This embodiment shows the method where the bar-like dough 1B is cut on the cutting conveyor 35 by the moving-up-and-down motion of the cutter. Then, the bar-like pieces of dough 1C are turned over so that one cutting plane faces upward and one faces downward, and the pieces of dough 1C are transferred to be placed in the baking mold 6.

In another embodiment, the bar-like dough 1B that drops from the downstream end of the conveyor may be cut with the horizontal movement of the cutter, instead of the vertical movement (for example, see Japanese Patent No. 2558200 and Japanese Patent Laid-open Publication No. 5-268864, whose applicant is the same as that of this application). Namely, the bar-like pieces of dough 1C that have been cut with the horizontal movement of the cutter directly drop into the baking mold, so that at least one cutting plane faces upward.

In this case, since the bar-like pieces of dough drop into the baking mold one-by-one, the baking mold is intermittently moved to the predetermined suitable position by any known means, so that the bar-like pieces of dough are arranged in one sequence in the baking mold.

Figure 8:
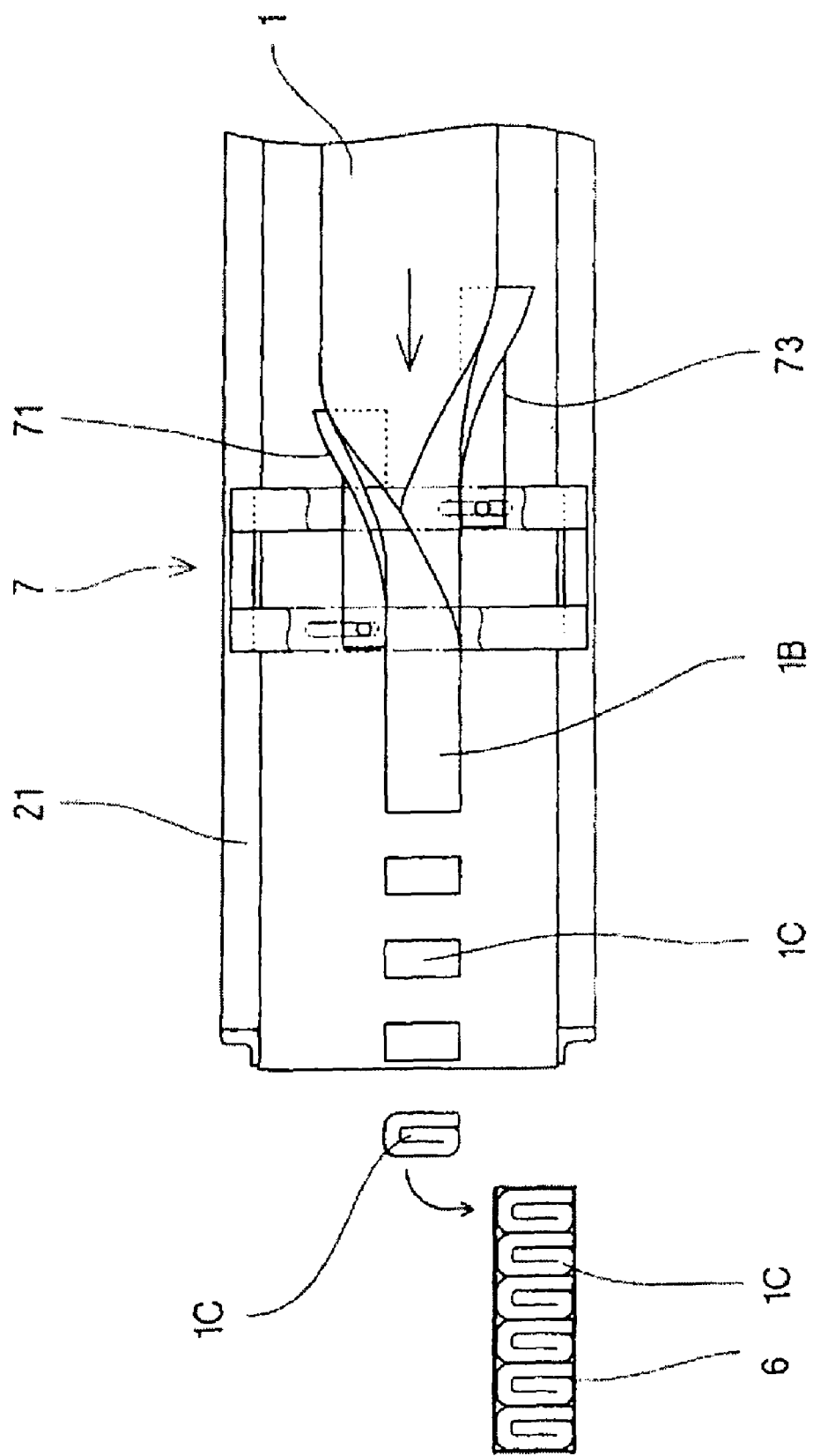
FIGS. 8-11 show another embodiment of the placing apparatus for placing bar-like pieces of dough of this invention.

FIG. 8 shows the forming step to form the bar-like dough 1B by means of folding, instead of rolling.

The folding means for bread dough is provided with a folding apparatus 7 that is mounted on the conveyor frames. The folding apparatus 7 has right and left folding members 71, 73, and they are mounted alternately on it. These folding members 71, 73 fold the sheet of dough from each side in turn so that the bar-like dough 1B is formed. Then, the cutting apparatus (not shown in FIG. 8) cuts the bar-like dough 1B, and the bar-like pieces 1C are placed in the baking molds 6 so that the cutting plane faces upward.

Figure 10:
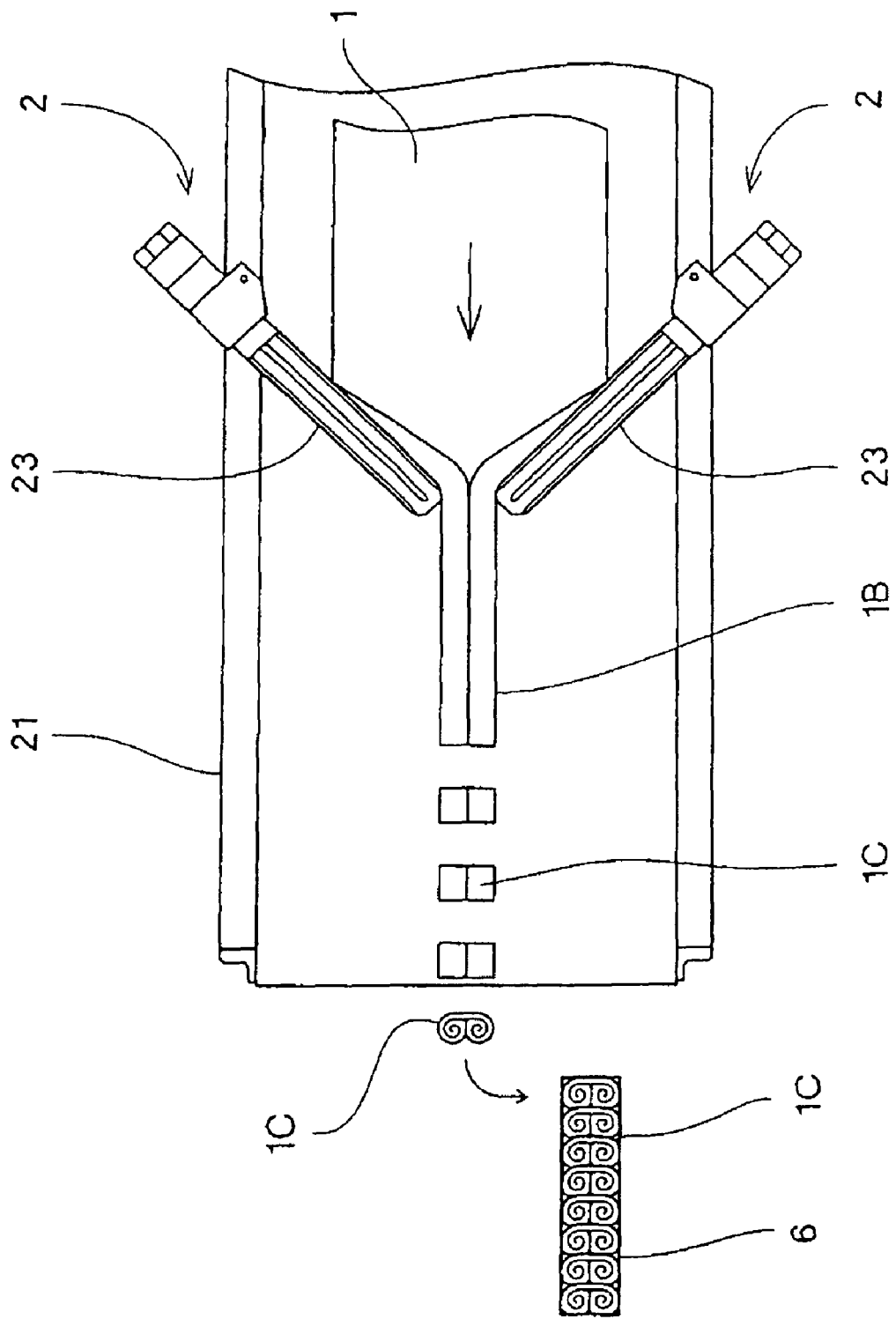

FIG. 10 shows two rolling apparatuses 2 that are mounted symmetrically. These apparatuses can roll the sheet of dough from each side symmetrically, and can form bar-like pieces of dough 1B that have a spiral and symmetrical pattern at its end surfaces, as shown in FIG. 10. Then, the cutting apparatus cuts the bar-like dough 1B to a predetermined size, and the pieces of dough 1C are placed in the baking molds 6.

Figure 11:
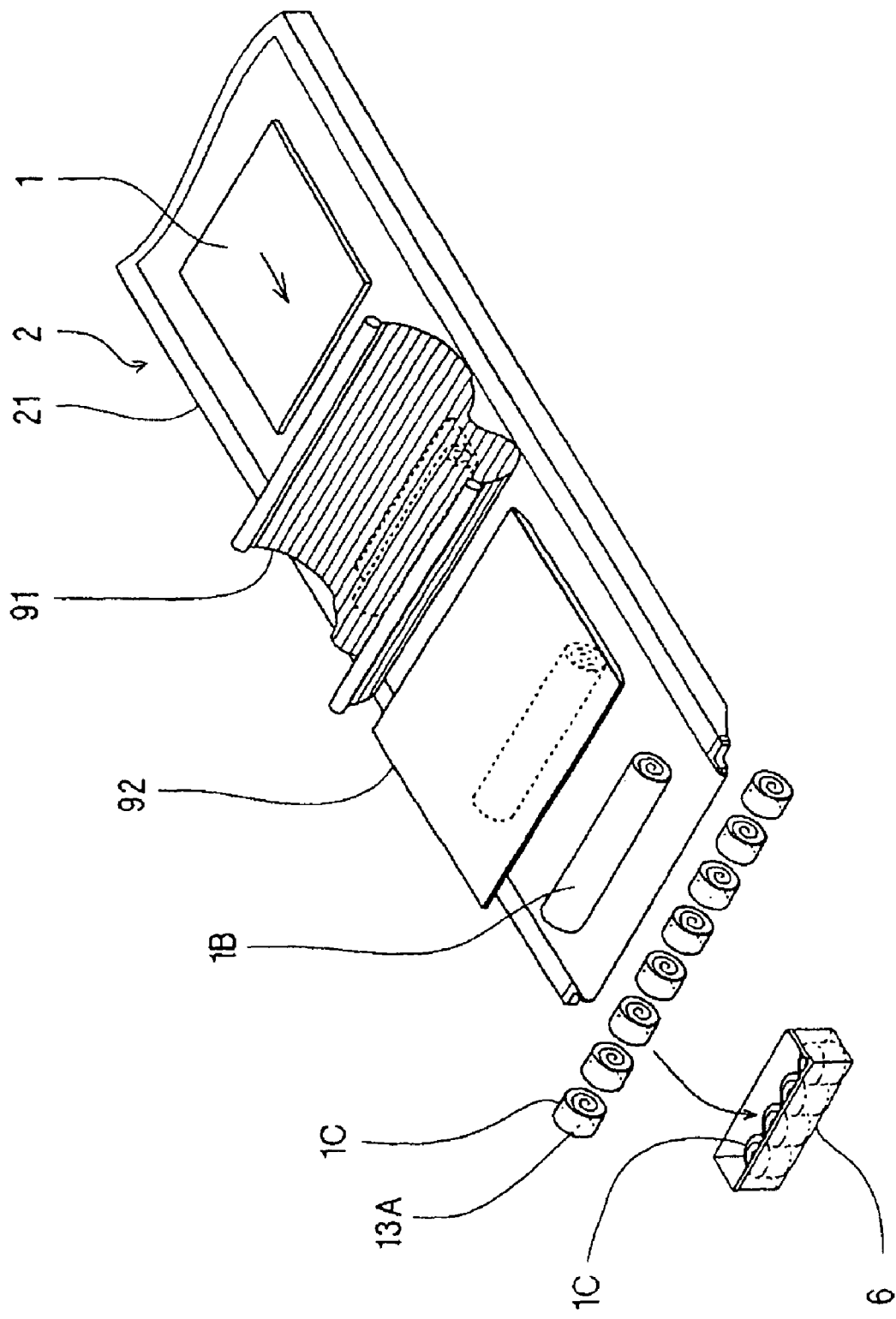

FIG. 11 shows a rolling means other than the rolling apparatus discussed above.

Namely, in this means, well known nets for rolling 91 and rolling plates 92 are used to roll the sheets of bread dough 1 that are cut to a predetermined size. In this case, the sheets of dough are rolled from the downstream end to the upstream end.

The sheets of bread dough 1 are rolled up by the nets for rolling 91, and bound tightly by the rolling plates 92 so as to form the bar-like dough 1B.

Then, the cutting apparatus cuts the bar-like dough 1B to a predetermined size, and the pieces of dough 1C are placed in the baking molds 6.

We discussed above the fact that in this invention the air bubbles between the layers of dough easily escape from the cut plane. In the embodiment shown in FIG. 11, neither side plane 13A of the bar-like dough 1B is a cut plane. But even if the plane 13A were to face upward in the baking mold, the air bubbles can still easily escape from it, because the surfaces between the layers of the bar-like pieces 1C are connected to the plane 13A and allow the air bubbles to escape.

This invention is not limited to the embodiment that is discussed above. For example, this invention can be applied to bread dough that includes solid food particles such as chocolate chips, raisins, and beans. In this invention, the bread dough can receive the solid food particles at the kneading step, or the solid food particles can be scattered on the bread dough before the rolling step. Thus bread that includes solid food particles can be manufactured by forming the bar-like dough. Especially, when the solid food particles are scattered on the sheet of dough, since it is formed into bar-like dough later, it is possible to distribute them easily and uniformly.

Figure 12:
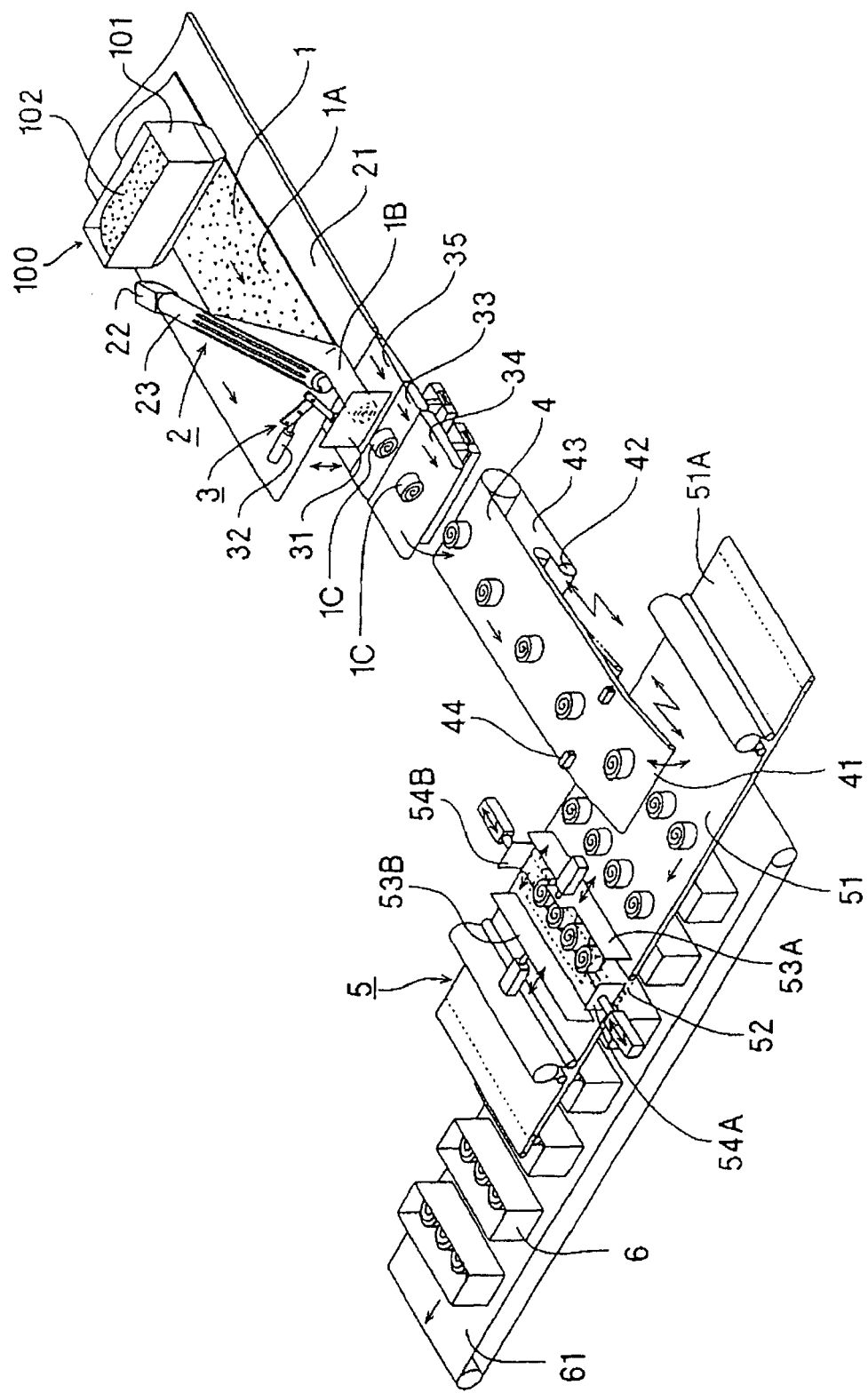
FIG. 12 shows the perspective view of another apparatus for manufacturing a loaf of bread according to the present invention.

FIG. 12 shows the apparatus for manufacturing bread according to the embodiment shown in FIG. 1, further comprising a scattering apparatus 100. The scattering apparatus 100, for scattering the solid food particles, is disposed above the conveyor 21 that conveys the continuous sheet of dough. The solid food particles 102, which are stored in a hopper 101 of the scattering apparatus 100, are scattered on the sheet of dough at a predetermined density. After the scattering, the sheet of dough is treated by means of the same apparatus and method as shown in FIG. 1. The bar-like pieces of dough that have been cut are placed in the baking molds 6 so that at least one cutting plane faces upward.

When the solid food particles are scattered on the sheet of dough and the bar-like dough is formed by rolling or folding the sheet of dough, because of those solid food particles large gaps may arise between the layers of the bar-like dough being formed by rolling or folding a sheet of dough during the forming or placing step, as shown in FIG. 13(a). However, in this invention, when the bar-like pieces 1C rise and expand vertically and horizontally in the rectangular parallelepiped baking molds and fill the entire space in the mold without any spaces being formed between the bar-like pieces of dough and between the bar-like pieces of dough and the wall of the mold, as shown by the arrows in FIG. 13(a), the interior pressure of the dough increases, as shown in FIG. 13(b), and it forces the air bubbles between the layers to escape from the dough (as shown by the arrows in FIG. 13(b)) through the layers and the cutting surface. Thus, a loaf of bread that includes solid food particles between the layers can be manufactured without air holes in it.

Although the invention has been described with reference to a certain embodiment, this description is not meant to be construed in a limiting sense. On the contrary, various modifications of the disclosed embodiment will become apparent to those skilled in the art upon reference to the description of the invention. It is therefore contemplated that the appended claims will cover such modifications, alternatives, and equivalents that fall within the true spirit and scope of the invention.

The invention claimed is:

1. A method for manufacturing a loaf of bread that is made by fermenting and baking bar-like pieces of dough in a rectangular parallelepiped baking mold so that the bar-like pieces of dough expand in the mold and a finished loaf fills the entire space in the mold without any spaces being formed between the bar-like pieces of dough and between the bar-like pieces of dough and the wall of the mold, comprising:
   a cutting step to cut bar-like dough which has layers of dough sheets to a predetermined size;
   a placing step to place a plurality of bar-like pieces of dough which have been cut at said cutting step in said baking mold so that at least one cutting plane faces vertically up from said baking mold for air bubbles in the layers of dough to escape from said cutting plane of the bar-like pieces of dough, and so that the plurality of the bar-like pieces of dough are disposed on a line and at equal intervals in the baking mold;
   a fermenting step to ferment said plurality of bar-like pieces of dough; and
   a baking step to bake said plurality of bar-like pieces of dough;
   wherein, in the placing step, the vertical length of the bar-like pieces of dough is ⅓ to ½ of the depth of the baking mold; and
   wherein, during the fermenting and the baking step, the bar-like pieces of dough first expand vertically and horizontally so that there is no space between the wall of the baking mold and the bar-like pieces of dough, an interior pressure of the dough increasing so that the air bubbles are forced upward to escape the dough; and then the bar-like pieces of dough expand only vertically while within the mold.

2. The method for manufacturing a loaf of bread of claim 1, further comprising a deforming step to deform said bar-like dough so that said bar-like dough has an elliptic cross section.

3. The method for manufacturing a loaf of bread of claim 1, wherein at said placing step said plurality of bar-like pieces of dough are placed in said baking mold under the condition that the side surfaces of said plurality of bar-like pieces of dough contact each other.

4. A method for manufacturing a loaf of bread that is made by fermenting and baking bar-like pieces of dough in a rectangular parallelepiped baking mold so that the bar-like pieces of dough expand in the mold and a finished loaf fills the entire space in the mold without any spaces being formed between the bar-like pieces of dough and between the bar-like pieces of dough and the wall of the mold, comprising:

- a cutting step to cut bar-like dough to a predetermined size, wherein said bar-like dough has layers of dough sheets and includes solid food particles in said dough;
- a placing step to place a plurality of bar-like pieces of dough which have been cut at said cutting step in said baking mold so that at least one cutting plane faces vertically up from said baking mold to enable air bubbles in the layers of dough to escape from said cutting plane of the bar-like pieces of dough, and so that the plurality of the bar-like pieces of dough are disposed on a line and at equal intervals in the baking mold;
- a fermenting step to ferment said plurality of bar-like pieces of dough; and
- a baking step to bake said plurality of bar-like pieces of dough;
- wherein, in the placing step, the vertical length of the bar-like pieces of dough is $\frac{1}{3}$ to $\frac{1}{2}$ of the depth of the baking mold; and
- wherein, during the fermenting and the baking step, the bar-like pieces of dough first expand vertically and horizontally so that there is no space between the wall of the baking mold and the bar-like pieces of dough, an interior pressure of the dough increasing so that the air bubbles are forced upward to escape the dough; and then the bar-like pieces of dough expand only vertically while within the mold.

5. The method for manufacturing a loaf of bread of claim 4, further comprising a deforming step to deform said bar-like dough so that said bar-like dough has an elliptic cross section.

6. The method for manufacturing a loaf of bread of claim 4, wherein at said placing step said plurality of bar-like pieces of dough are placed in said baking mold under the condition that the side surfaces of said plurality of bar-like pieces of dough contact each other.

7. A method for manufacturing a loaf of bread wherein the loaf of bread is made by fermenting and baking bar-like pieces of dough in a rectangular parallelepiped baking mold so that the bar-like pieces of dough expand in the mold and a finished loaf fills the entire space in the mold without any spaces being formed between the bar-like pieces of dough and between the bar-like pieces of dough and the wall of the mold, comprising:

- forming and conveying steps to form a sheet of bread dough and convey said sheet by a conveyor;
- a forming step to form from said sheet of bread dough bar-like dough having layers of dough sheets;
- a cutting step to cut said bar-like dough to a predetermined size;
- a placing step to place a plurality of bar-like pieces of dough which have been cut at said cutting step in said baking mold so that at least one cutting plane faces vertically up from said baking mold to enable air bubbles in the layers of dough to escape from said cutting plane of the bar-like pieces of dough, and so that the plurality of the bar-like pieces of dough are disposed on a line and at equal intervals in the baking mold;
- a fermenting step to ferment said plurality of bar-like pieces of dough; and
- a baking step to bake said plurality of bar-like pieces of dough;
- wherein, in the placing step, the vertical length of the bar-like pieces of dough is $\frac{1}{3}$ to $\frac{1}{2}$ of the depth of the baking mold; and
- wherein, during the fermenting and the baking step, the bar-like pieces of dough first expand vertically and horizontally so that there is no space between the wall of the baking mold and the bar-like pieces of dough, an interior pressure of the dough increasing so that the air bubbles are forced upward to escape the dough; and then the bar-like pieces of dough expand only vertically while within the mold.

* * * * *